United States Patent
Kim et al.

(10) Patent No.: US 11,886,671 B2
(45) Date of Patent: Jan. 30, 2024

(54) TOUCH SENSOR AND DISPLAY DEVICE INCLUDING THE SAME

(71) Applicant: SAMSUNG DISPLAY CO., LTD., Yongin-si (KR)

(72) Inventors: Hyung Bae Kim, Yongin-si (KR); Min Hong Kim, Yongin-si (KR); Sang Kook Kim, Yongin-si (KR); Tae Joon Kim, Yongin-si (KR); Jae Hyun Park, Yongin-si (KR); Ji Yeong Lee, Yongin-si (KR); Hyun Wook Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/807,166

(22) Filed: Jun. 16, 2022

(65) Prior Publication Data

US 2023/0152928 A1    May 18, 2023

(30) Foreign Application Priority Data

Nov. 16, 2021   (KR) .......................... 10-2021-0158018

(51) Int. Cl.
*G06F 3/044* (2006.01)
*G06F 3/041* (2006.01)

(52) U.S. Cl.
CPC .......... *G06F 3/0443* (2019.05); *G06F 3/0446* (2019.05); *G06F 3/04164* (2019.05)

(58) Field of Classification Search
CPC ... G06F 3/0443; G06F 3/0446; G06F 3/04164
USPC ......................................................... 345/173
See application file for complete search history.

(56) References Cited

U.S. PATENT DOCUMENTS

| | | | |
|---|---|---|---|
| 10,996,804 B2 | 5/2021 | Jun et al. | |
| 2009/0091545 A1* | 4/2009 | Wang | G06F 1/1626 345/173 |
| 2017/0024060 A1* | 1/2017 | Seong | G06F 3/0446 |
| 2017/0249039 A1* | 8/2017 | Kim | G06F 3/0443 |
| 2017/0337411 A1* | 11/2017 | Liu | G06V 40/1306 |
| 2018/0157395 A1* | 6/2018 | Mhun | G06F 3/04883 |
| 2018/0348910 A1* | 12/2018 | Lee | G06F 3/0448 |
| 2019/0034010 A1* | 1/2019 | Lee | G06F 3/0446 |
| 2020/0167037 A1* | 5/2020 | Lee | G06F 3/0443 |
| 2021/0096725 A1* | 4/2021 | Garg | G06F 3/04186 |

* cited by examiner

*Primary Examiner* — Mark Edwards
(74) *Attorney, Agent, or Firm* — F. CHAU & ASSOCIATES, LLC

(57) ABSTRACT

A touch sensor includes first touch cells disposed in a first touch sensing area, the first touch cells each including a first touch pattern and a first dummy pattern, and second touch cells disposed in a second touch sensing area, the second touch cells each including a second touch pattern and a second dummy pattern. An area of a first dummy pattern area in which the first dummy pattern is disposed is greater than an area of a second dummy pattern area in which the second dummy pattern is disposed.

23 Claims, 16 Drawing Sheets

TOUCH SENSOR AND DISPLAY DEVICE INCLUDING THE SAME

CROSS-REFERENCE TO RELATED APPLICATION

The present application claims priority under 35 U.S.C. § 119(a) to Korean patent application 10-2021-0158018, filed on Nov. 16, 2021 in the Korean Intellectual Property Office, the entire disclosure of which is herein incorporated by reference.

TECHNICAL FIELD

The present disclosure generally relates to a display device, and more particularly, to a display device including a touch sensor having multiple touch sensing areas.

DISCUSSION OF THE RELATED ART

Display devices are often configured as touch-screen display devices that include a display panel along with a touch sensor to register a touch of a user.

The touch sensor may be attached to one surface of a display panel, for example, a display surface of the display panel. Alternatively, the touch sensor may be integrally formed with the display panel. A user may input information by pressing or touching the touch sensor while viewing an image implemented on the display panel.

SUMMARY

A touch sensor includes first touch cells disposed in a first touch sensing area, the first touch cells each including a first touch pattern and a first dummy pattern that is disposed within a first dummy pattern area, and second touch cells disposed in a second touch sensing area, the second touch cells each including a second touch pattern and a second dummy pattern that is disposed within a second dummy pattern area. An area of the first dummy pattern area is greater than an area of the second dummy pattern area.

The first touch pattern may be disposed within a first touch pattern area, the second touch pattern may be disposed within a second touch pattern area, and an area of the first touch pattern area may be smaller than an area of the second touch pattern area.

The touch sensor may further include first sensing lines each including a first portion connected to a portion of the first touch cells and extended in a first direction in a non-sensing area, and second sensing lines each including a second portion connected to a portion of the second touch cells and extended in the first direction in the non-sensing area.

A thickness of the first portion may be greater than a thickness of the second portion.

A width of the first portion may be greater than a width of the second portion.

A size of the first dummy pattern area in the second touch sensing area may be gradually changed in the first direction.

The first touch sensing area may include first sub-touch sensing areas each including the first dummy pattern area. The second touch sensing area may include second sub-touch sensing areas each including the second dummy pattern area. The first sub-touch sensing areas and the second sub-touch sensing areas may be alternately disposed in the first direction.

Each of the first touch pattern, the second touch pattern, the first dummy pattern, and the second dummy pattern may include a mesh pattern formed with fine conductive lines.

A thickness of the fine conductive lines of the first touch pattern may be greater than a thickness of the fine conductive lines of the second touch pattern.

A width of the fine conductive lines of the first touch pattern may be greater than a width of the fine conductive lines of the second touch pattern.

A thickness of the fine conductive lines of the first dummy pattern may be greater than a thickness of the fine conductive lines of the second dummy pattern.

A width of the fine conductive lines of the first dummy pattern may be greater than a width of the fine conductive lines of the second dummy pattern.

The touch sensor may further include a sensor driver configured to determine a touch position, based on a difference between raw data provided from the first touch cells and the second touch cells and a value of a baseline corresponding to a base capacitance of the first and second touch cells, and update the value of the baseline, based on a change in the raw data in a state in which there is no touch input.

A display device includes a display panel including a display area having pixels, and a touch sensor including a first touch sensing area and a second touch sensing area. The touch sensor is configured to sense a touch input. The first touch sensing area and the second touch sensing area each overlap the display area. The touch sensor incudes first touch cells disposed in the first touch sensing area, the first touch cells each including a first touch pattern and a first dummy pattern disposed within a first dummy pattern area, and second touch cells disposed in the second touch sensing area, the second touch cells each including a second touch pattern and a second dummy pattern disposed within a second dummy pattern area. An area of the first dummy pattern area is greater than an area of the second dummy pattern area.

The first touch pattern may be disposed within a first touch pattern area. The second touch pattern may be disposed within a second touch pattern area. An area of the first touch pattern area may be smaller than an area of the second touch pattern area.

The touch sensor may further include first sensing lines each including a first portion connected to a portion of the first touch cells and extended in a first direction in a non-sensing area, and second sensing lines each including a second portion connected to a portion of the second touch cells and extended in the first direction in the non-sensing area. A width of the first portion may be greater than a width of the second portion.

The touch sensor may further include first sensing lines each including a first portion connected to a portion of the first touch cells and extended in a first direction in a non-sensing area, and second sensing lines each including a second portion connected to a portion of the second touch cells and extended in the first direction in the non-sensing area. A thickness of the first portion may be greater than a thickness of the second portion.

The display device may further include a fingerprint sensor overlapping the second touch sensing area.

The display panel may display a keypad image overlapping the second touch sensing area.

A display device includes a display panel including a display area having pixels, and a touch sensor including a first touch sensing area and a second touch sensing area. The touch sensor is configured to sense a touch input. The first touch sensing area and the second touch sensing area each overlap the display area. The touch sensor includes first touch cells disposed in a first touch sensing area, second touch cells disposed in a second touch sensing area, first sensing lines each including a first portion connected to a portion of the first touch cells and extended in a first direction in a non-sensing area, and second sensing lines each including a second portion connected to a portion of the second touch cells and extended in the first direction in the non-sensing area. A width and/or a thickness of the first portion is greater than a width and/or a thickness of the second portion, respectively.

Each of the first touch cells may include a first touch pattern and a first dummy pattern, and each of the second touch cells may include a second touch pattern and a second dummy pattern.

Each of the first touch pattern and the second touch pattern may include a mesh pattern formed with fine conductive lines. A width and/or a thickness of the fine conductive lines of the first touch pattern may be greater than a width and/or a thickness of the fine conductive lines of the second touch pattern, respectively.

The display device may further include a fingerprint sensor overlapping the second touch sensing area. The display panel may display a keypad image overlapping the second touch sensing area.

The touch sensor may further include a sensor driver configured to determine a touch position, based on a difference between raw data provided from the first touch cells and the second touch cells and a value of a baseline corresponding to a base capacitance of the first and second touch cells, and update the value of the baseline, based on a change in the raw data in a state in which there is no touch input.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
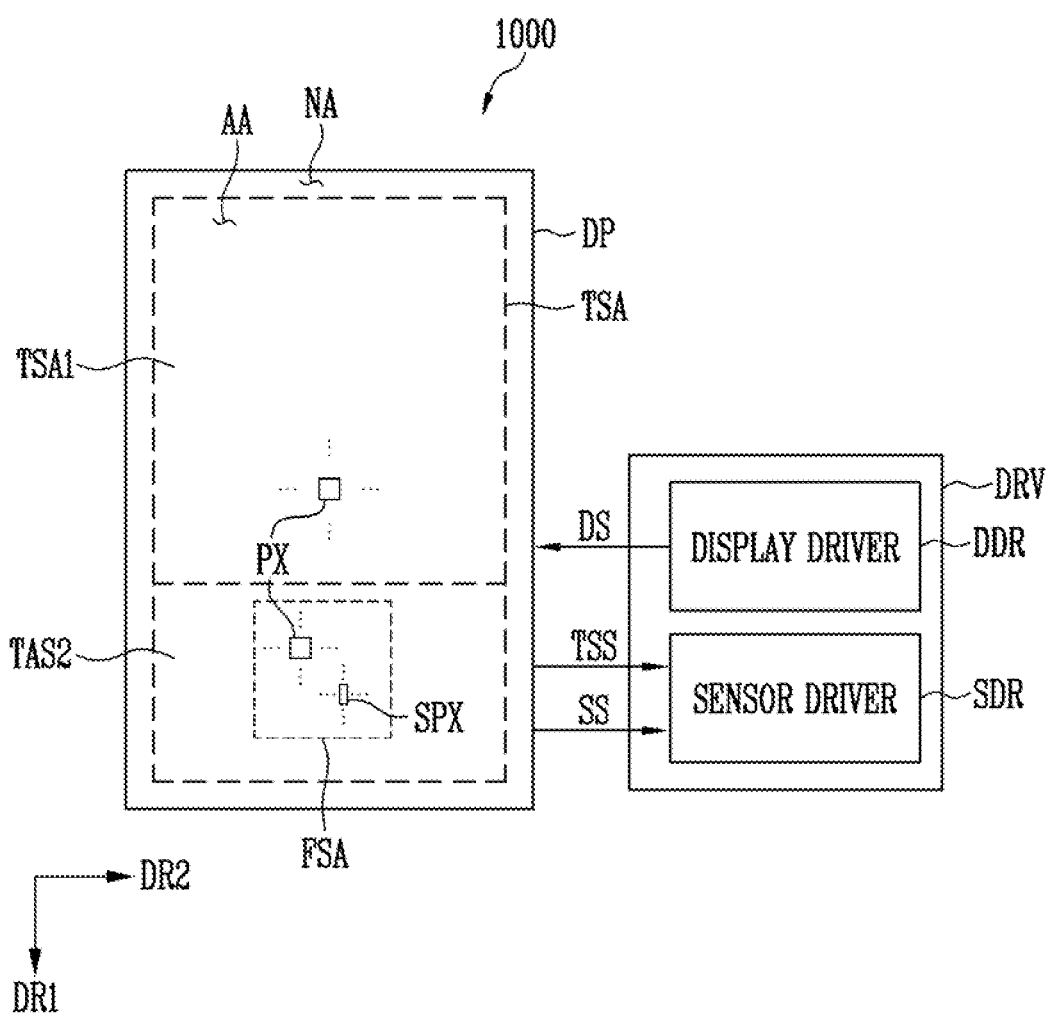
FIG. 1 is a diagram illustrating a display device in accordance with embodiments of the present disclosure.

Example embodiments will now be described more fully hereinafter with reference to the accompanying drawings; however, they may be embodied in different forms and should not necessarily be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals may refer to like elements throughout the specification and the drawings.

Throughout the drawings, the same reference numerals may be given to the same elements, and to the extent that a detailed description for one or more elements has been omitted, it may be assumed that those elements are at least similar to corresponding elements that have been described elsewhere within the present disclosure.

Figure 2:
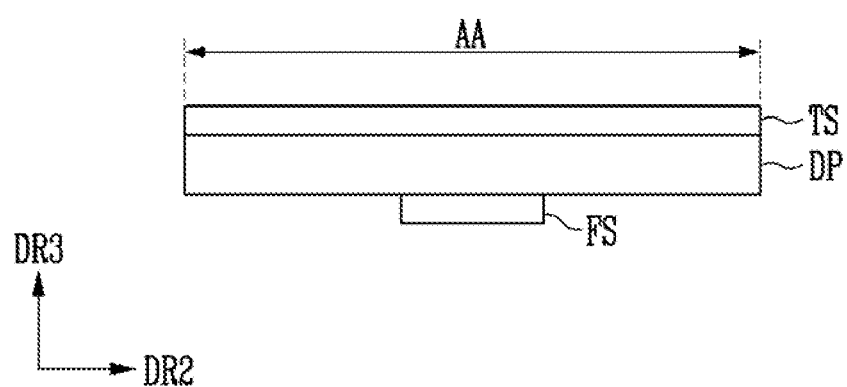
FIG. 2 is a cross-sectional view illustrating an example of a portion of a display area of the display device shown in FIG. 1.

FIG. 1 is a diagram illustrating a display device in accordance with embodiments of the present disclosure. FIG. 2 is a cross-sectional view illustrating an example of a portion of a display area of the display device shown in FIG. 1.

Referring to FIGS. 1 and 2, the display device 1000 may include a display panel DP, a touch sensor TS, a fingerprint sensor FS, and a driver DRV. The driver DRV may include a display driver DDR and a sensor driver SDR.

In an embodiment, the display device 1000 may further include a printed circuit board on which at least a portion of the driver DRV is mounted.

The whole or at least a portion of the display device 1000 may be flexible. As used herein, the term "flexible" may mean that the element so-described may be bent, folded, rolled, and/or stretched to a non-trivial extent without cracking or otherwise sustaining damage. The display device 1000 may be implemented as a self-luminous display device including a plurality of self-luminous elements. For example, the display device 1000 may be an organic light emitting display device including organic light emitting elements, a display device including inorganic light emitting elements, or a display device including light emitting elements configured with a combination of inorganic and organic materials. However, the display device 1000 may be implemented as a liquid crystal display device, a plasma display device, a quantum dot display device, or the like. Light emitting elements included in the display panel DP of the quantum dot display device may include a quantum dot and/or a quantum rod.

The display device 1000 may be a flat panel display device, a flexible display device, a curved display device, a foldable display device, or a bendable display device. Also, the display device 1000 may be applied to a transparent display device, a head-mounted display device, a wearable display device, and the like.

A display surface on which an image is displayed may be parallel to a surface defined by a first direction DR1 and a second direction DR2. A normal direction of the display surface, i.e., a thickness direction of the display device 1000 may be expressed as a third direction DR3.

The display panel DP includes a display area AA and a non-display area NA. The display area AA is an area in which a plurality of pixels PX are provided and may be referred to as an active area. Each of the pixels PX may include at least one light emitting element. The display device 1000 drives the pixels PX, corresponding to image data input from an external source, to display an image in the display area AA.

The non-display area NA is an area disposed at the periphery of the display area AA and may be referred to as a non-active area. For example, the non-display area NA includes a pad area, and may further include a line area, various dummy areas, and the like. The printed circuit board may be attached to the pad area.

In an embodiment, the display area AA may include a touch sensing area TSA. The touch sensing area TSA may be implemented by the touch sensor TS. For example, the touch sensor TS may be disposed corresponding to the display area AA of the display panel DP, and the touch sensing area TSA may be formed throughout the entire surface of the display area AA as shown in FIG. 1.

For example, as shown in FIG. 2, the touch sensor TS may be disposed corresponding to the touch sensing area TSA on the display panel DP. The touch sensor TS may include touch electrodes configured with touch cells arranged corresponding to the touch sensing area TSA. In an embodiment, the touch sensor may be a capacitance type touch sensor. For example, some of the touch electrodes (e.g., driving electrodes) may receive a touch driving signal, and other some of the touch electrodes (e.g., sensing electrodes) may output, as a touch sensing signal TSS, a variation in capacitance between the touch electrodes. When a portion of the body of a user is disposed on electrostatically coupled touch electrodes, a capacitance between the touch electrodes may be changed.

In addition, the display area AA may include a fingerprint sensing area FSA. The fingerprint sensing area FSA may be implemented by the fingerprint sensor FS. For example, the fingerprint sensor FS may include a plurality of sensor pixels SPX. The fingerprint sensing area FSA may be an area overlapping with the sensor pixels SPX.

In an embodiment, the touch sensing area TSA may include a first touch sensing area TSA1 and a second touch sensing area TSA2. At least a portion of the second touch sensing area TSA2 may overlap with the fingerprint sensing area FSA. In an embodiment, an RC delay of a touch sensing signal TSS provided in the second touch sensing area TSA2 may be greater than an RC delay of a touch sensing signal TSS in the first touch sensing area TSA1. For example, a touch sensitivity of the second touch sensing area TSA2 may be lower than a touch sensitivity of the first touch sensing area TSA1. This arrangement may be able to reduce the occurrence of touch malfunctions and touch misrecognitions of the second touch sensing area TSA2 at a low temperature environment (e.g., 0° C. or lower), in touch sensor driving to which a baseline tracking method is applied. The driving using the baseline tracking method will be described below with reference to FIGS. 5 and 6.

The fingerprint sensing area FSA may overlap with at least a portion of the touch sensing area TSA. In an embodiment, as shown in FIG. 1, a portion of the display area AA may be set as the fingerprint sensing area FSA. For example, the fingerprint sensing area FSA may have a size similar to a fingerprint area of a thumb of an average-sized adult male.

However, the touch sensing area TSA and the fingerprint sensing area FSA may be formed in at least a portion of the non-display area NA of the display panel DP.

In an embodiment, the sensor pixels SPX may be configured with a photo sensor for sensing light. When light emitted from a light source (or pixel PX) provided in the display device 1000 is reflected by skin of a finger or the like of a user, the sensor pixels SPX may sense the reflected light and output a corresponding electrical signal (e.g., a voltage signal). An electrical signal of each of the sensor pixels SPX may constitute one dot in a fingerprint image (i.e., a dot of light and shade or a pixel as a minimum unit constituting the fingerprint image). Reflected light incident onto the respective sensor pixels SPX may have different optical characteristics (e.g., different frequencies, different wavelength, different intensities, or the like) according to whether the reflected light is caused by valleys or ridges of a fingerprint (or skin pattern) formed at the finger (or palm or skin) of the user. Therefore, the sensor pixels SPX may output sensing signals SS having different electrical characteristics, corresponding to the optical characteristics of the reflected light.

When the sensor pixels SPX are disposed in the fingerprint sensing area FSA, the sensor pixels SPX may overlap with the pixels PX or be disposed at the periphery of the pixels PX. For example, some or all of the sensor pixels SPX may overlap with the pixels PX or be disposed between the pixels PX. In various embodiments, the sensor pixels SPX and the pixels PX may have sizes equal to or different from each other. The relative size and arrangement of the sensor pixels SPX and the pixels are not necessarily limited to the arrangements described herein.

In an embodiment, the sensor pixels SPX may constitute an ultrasonic senor for sensing ultrasonic waves. The sensor pixels SPX may release an ultrasonic signal and sensing ultrasonic waves reflected by the finger of the user, thereby outputting corresponding electrical signals (or sensing signals SS).

In an embodiment, the sensor pixels SPX may constitute a capacitance sensor of which capacitance is changed according to shapes of fingerprints.

In an embodiment, as shown in FIG. 2, the fingerprint sensor FS including the sensor pixels SPX may be disposed on the other surface (e.g., a rear surface) opposite to one (e.g., a front surface) of both surfaces of the display panel DP, on which an image is displayed. However, the present disclosure is not necessarily limited thereto. For example, the sensor pixels SPX (i.e., the fingerprint sensor FS) may be disposed between the touch sensor TS and the display panel DP or be embedded in a backplane structure of the display panel DP. Also, the sensor pixels SPX may be disposed between the touch electrodes of the touch sensor TS.

In an embodiment, the display driver DDR and the sensor driver SDR may be disposed on the printed circuit board. However, a component having a function of at least a portion of the display driver DDR and the sensor driver SDR may be disposed directly on the display panel DP.

The display driver DDR may drive the display panel DP. For example, the display driver DDR may output a data signal DS corresponding to image data to the display panel DP.

The sensor driver SDR may drive the touch sensor TS and the fingerprint sensor FS.

In an embodiment, the sensor driver SDR may provide the touch sensor TS with a touch driving signal for driving the touch sensor TS. The sensor driver SDR may calculate a coordinate of a touch position by detecting a changed capacitance of a touch sensing signal TSS received from the touch sensor TS.

In an embodiment, the sensor driver SDR may output a driving signal (e.g., a control signal) for the sensor pixel SPX of the fingerprint sensor FS and receive sensing signals SS received from the sensor pixels SPX.

FIGS. 3A to 3D are plan views illustrating examples of the touch sensor included in the display device shown in FIG. 1.

Referring to FIGS. 1, 3A, 3B, 3C, and 3D, the touch sensor TS may include sensing electrodes RX1 to RX5, first signal lines SL1-1 to SL1-5 connected to the sensing electrodes RX1 to RX5, driving electrodes TX1 to TX4, and second signal lines SL2-1 to SL2-4 connected to the driving electrodes TX1 to TX4.

However, the sensing electrodes RX1 to RX5 and the driving electrodes TX1 to TX4 are not necessarily limited to a corresponding function. For example, the driving signals may be provided to the sensing electrodes RX1 to RX5 according to a form connected to the sensor driver SDR, and a touch position may be sensed based on signals provided from the driving electrodes TX1 to TX4.

An external input may be sensed in a mutual capacitance manner using a capacitance change between the sensing electrodes RX1 to RX5 and the driving electrodes TX1 to TX4.

In an embodiment, the touch sensor TS may further include an optical dummy electrode disposed in a boundary area between the sensing electrodes RX1 to RX5 and the driving electrodes TX1 to TX4.

The sensing electrodes RX1 to RX5 and the driving electrodes TX1 to TX4 intersect each other. The sensing electrodes RX1 to RX5 are arranged in substantially parallel to the first direction DR1, and each of the sensing electrodes RX1 to RX5 has a shape extending in parallel to the second direction DR2.

In an embodiment, the sensing electrodes RX1 to RX5 and the driving electrodes TX1 to TX4 may have a shape (e.g., a bar shape) in which touch cells TSE and a connection part connecting the same are not distinguished from each other. Although a rhombic touch cells TSE are exemplarily illustrated, the present disclosure is not necessarily limited thereto, and the touch cells TSE may each have another polygonal shape.

In an embodiment, the sensing electrodes RX1 to RX5 and the driving electrodes TX1 to TX4 may be formed in a mesh pattern.

In an embodiment, a touch sensing area TSA may include a first touch sensing area TSA1 and a second touch sensing area TSA2. For example, first to third sensing electrodes RX1 to RX3 may be included in the first touch sensing area TSA1, and fourth and fifth sensing electrodes RX4 and RX5 may be included in the second touch sensing area TSA2. Each of first to fourth driving electrodes TX1 to TX4 may be formed throughout the first touch sensing area TSA1 and the second touch sensing area TSA2.

Each of the sensing electrodes RX1 to RX5 and the driving electrodes TX1 to TX4 may include touch cells TSE. The touch cells TSE may include a first touch cell TSE1 formed in the first touch sensing area TSA1 and a second touch cell TSE2 formed in the second touch sensing area TSA2.

For example, the first touch cell TSE1 may include a first sensing touch cell RX_SE1 and a first driving touch cell TX_SE1. The second touch cell TSE2 may include a second sensing touch cell RX_SE2 and a second driving touch cell TX_SE2.

The first sensing touch cell RX_SE1 may constitute the first to third sensing electrodes RX1 to RX3 of the first touch sensing area TSA1, and the second sensing touch cell RX_SE2 may constitute the fourth and fifth sensing electrodes RX4 and RX5 of the second touch sensing area TSA2. The first driving touch cell TX_SE1 may constitute a portion at which the first to fourth driving electrodes TX1 to TX4 overlap with the first touch sensing area TSA1, and the second driving touch cell TX_SE2 may constitute a portion at which the first to fourth driving electrodes TX1 to TX4 overlap with the second touch sensing area TSA2.

The first driving touch cell TX_SE1 and the second driving touch cell TX_SE2 are components electrically and physically connected to each other. In an embodiment, it may be understood that the first driving touch cell TX_SE1 and the second driving touch cell TX_SE2 are components substantially identical to each other.

Configurations and/or shapes of the first sensing touch cell RX_SE1 and the second sensing touch cell RX_SE2 may be equal to each other and be designed differently from each other.

The first sensing touch cell RX_SE1 or the second sensing touch cell RX_SE2 may be arranged along the second direction DR2 in one sensing electrode. For example, the first sensing touch cell RX_SE1 may be arranged along the second direction DR2 in the first sensing electrode RX1 of the first touch sensing area TSA1, and the second sensing touch cell RX_SE2 may be arrange along the second direction DR2 in the fourth sensing electrode RX4 of the second touch sensing area TSA2.

The first driving touch cell TX_SE1 may be arranged along the first direction DR1 in one driving electrode (e.g., the first touch sensing area TSA1 of the first driving electrode TX1), and the second driving touch cell TX_SE2 may be arranged along the first direction DR1 in the driving electrode (e.g., the second touch sensing area TSA2 of the first driving electrode TX1).

Figure 3A:
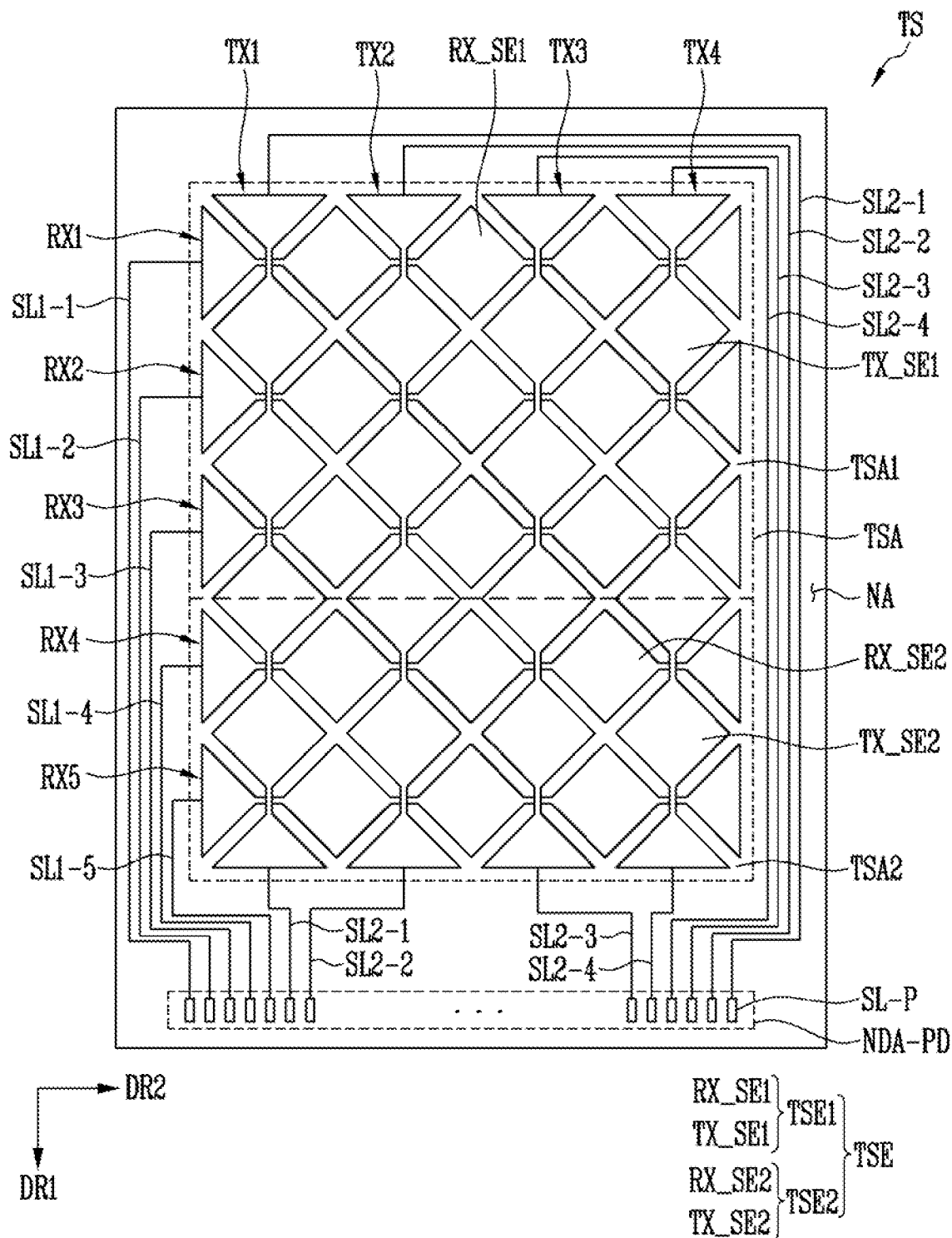
FIGS. 3A to 3D are plan views illustrating examples of a touch sensor included in the display device shown in FIG. 1.

As shown in FIG. 3A, the first signal lines SL1-1 to SL1-5 are respectively connected to a single end of the sensing electrodes RX1 to RX5. In addition, the second signal lines SL2-1 to SL2-4 are connected to opposite ends of the driving electrodes TX1 to TX4.

Figure 3B:
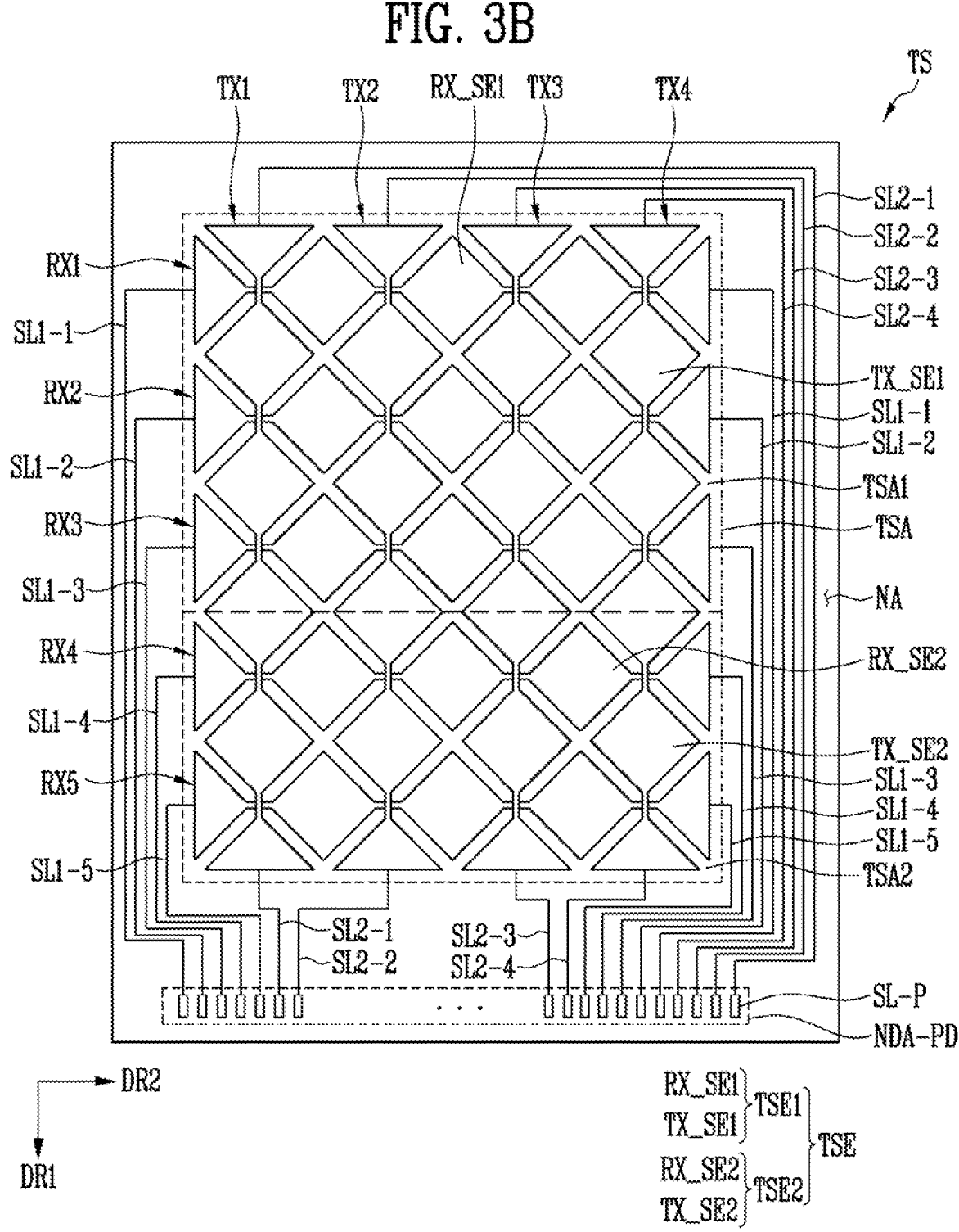

In an embodiment, as shown in FIG. 3B, the first signal lines SL1-1 to SL1-5 may be connected to opposite ends of the sensing electrodes RX1 to RX5.

Figure 3C:
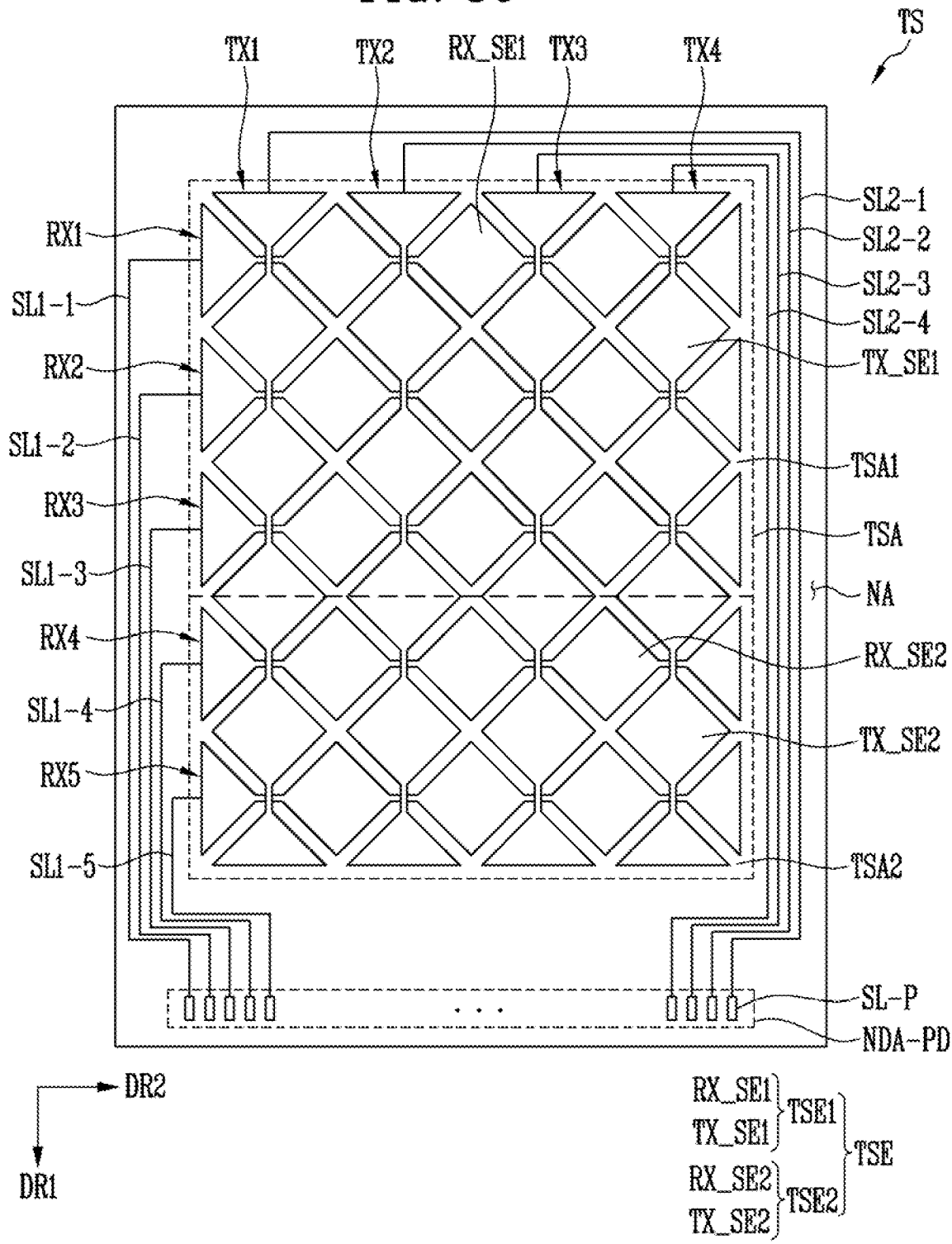

In an embodiment, as shown in FIG. 3C, the second signal lines SL2-1 to SL2-4 may be respectively connected to only a single end of the driving electrodes TX1 to TX4.

Figure 3D:
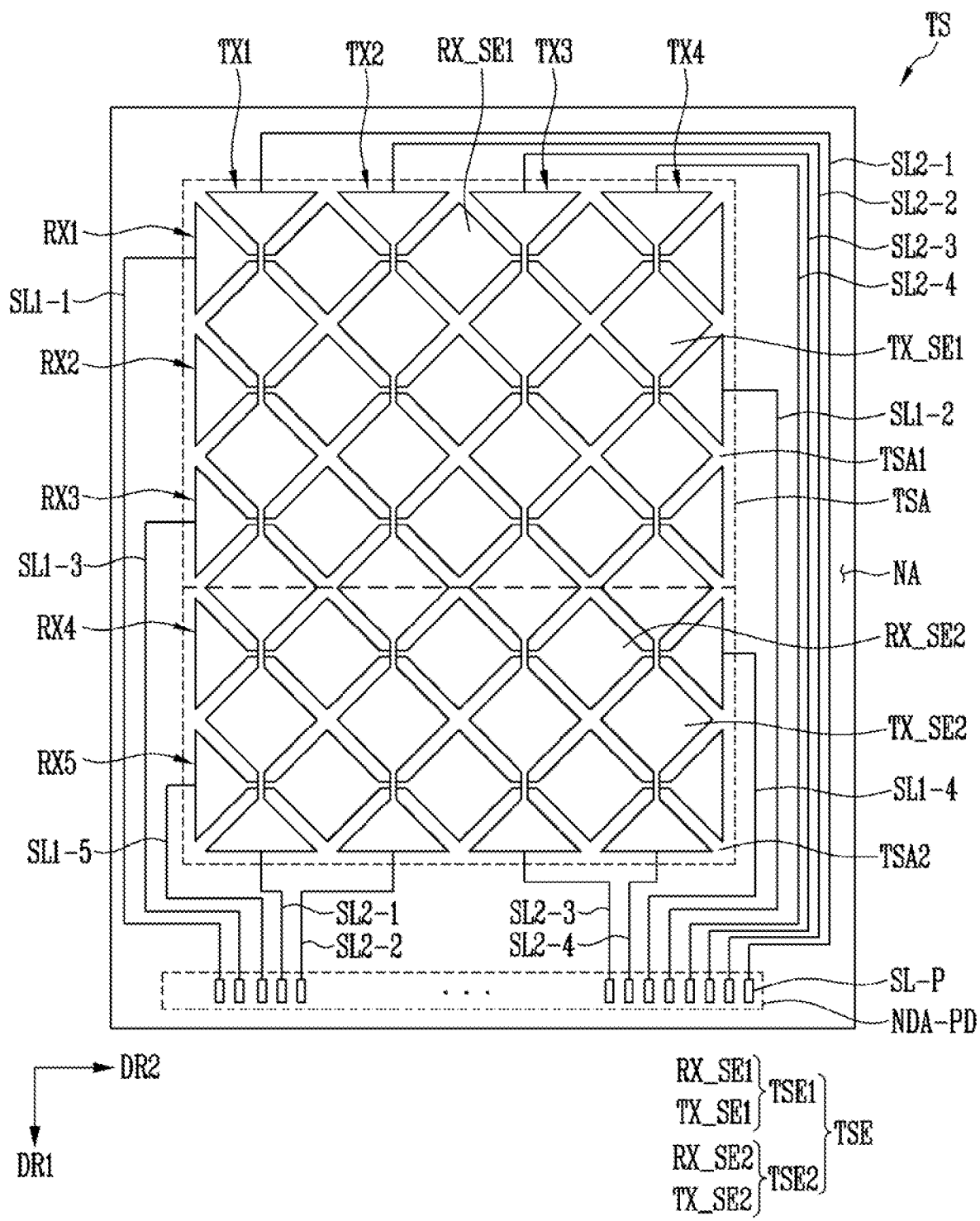

In an embodiment, as shown in FIG. 3D, the first signal lines SL1-1 to SL1-5 may be alternately connected respectively to opposite ends of the sensing electrodes RX1 to RX5. For example, odd-numbered first signal lines SL1-1, SL1-3, and SL1-5 may be respectively connected to first ends of odd-numbered sensing electrodes RX1, RX3, and RX5, and even-numbered first signal lines SL1-2 and SL1-4 may be respectively connected to second ends (e.g., end portions of the opposite surfaces of the one ends) of even-numbered sensing electrodes RX2 and RX4.

However, the connections between the signal lines SL1-1 to SL1-5 and SL2-1 to SL2-4 and the electrodes TX1 to TX4 and RX1 to RX5 are not necessarily limited thereto.

In an embodiment, a line resistance of the first signal lines SL1-4 and SL1-5 corresponding to the second touch sensing area TSA2 may be greater than a line resistance of the first signal lines SL1-1, SL1-2, and SL1-3 corresponding to the first touch sensing area TSA1. For example, a line width of the first signal lines SL1-4 and SL1-5 may be narrower than a line width of the first signal lines SL1-1, SL1-2, and SL1-3. A line thickness (e.g., thickness in the third direction DR3) of the first signal lines SL1-4 and SL1-5 may be smaller than a line thickness of the first signal lines SL1-1, SL1-2, and SL1-3. Therefore, an RC delay of a touch sensing signal TSS corresponding to the second touch sensing area TSA2 may be greater than an RC delay of a touch sensing signal TSS corresponding to the first touch sensing area TSA1.

The first signal lines SL1-1 to SL1-5 and the second signal lines SL2-1 to SL2-4 may include pad parts SL-P. The pad parts SL-P may be aligned in a pad area NDA-PD.

However, the planar shape of the touch sensor TS is not necessarily limited thereto.

Figure 4:
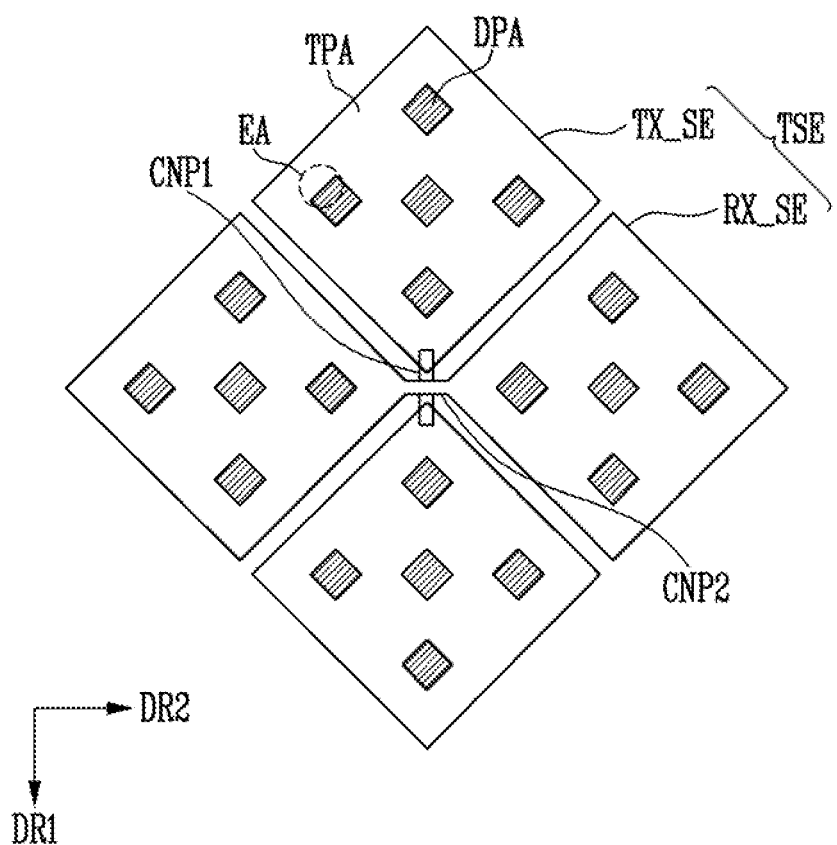
FIG. 4 is a plan view illustrating an example of sensing cells included in the touch sensor shown in FIG. 3A.

FIG. 4 is a plan view illustrating an example of the sensing cells included in the touch sensor shown in FIG. 3A.

Referring to FIGS. 3A and 4, touch cells TSE may include driving touch cells TX_SE and sensing touch cells RX_SE.

The driving touch cells TX_SE and the sensing touch cells RX_SE, which are shown in FIG. 4, may be included in the first touch sensing area TSA1 and/or the second touch sensing area TSA2.

The driving touch cells TX_SE may be arranged in the first direction DR1 and may be electrically connected to each other by a first connection pattern CNP1. The sensing touch cells RX_SE may be arranged in the second direction DR2 and may be electrically connected through the second connection pattern CNP2. The driving touch cells TX_SE and the first connection pattern CNP1 may form the driving electrode TX1 to TX4, and the sensing touch cells RX_SE and the second connection pattern CNP2 may form the sensing electrodes RX1 to RX5.

In an embodiment, the second connection pattern CNP2, the driving touch cells TX_SE, and the sensing touch cells RX_SE may be disposed in the same layer, and the first connection pattern CNP1 may be disposed in a layer different from the layer of the second connection pattern CNP2, the driving touch cells TX_SE, and the sensing touch cells RX_SE. Accordingly, the driving electrodes TX1 to TX4 and the sensing electrodes RX1 to RX5 are not short-circuited with each other.

In an embodiment, each of the driving touch cells TX_SE and the sensing touch cells RX_SE may include a touch pattern area TPA including a touch pattern and a dummy pattern area DPA including a dummy pattern. The touch pattern and the dummy pattern are insulated from each other. For example, the dummy pattern may be disposed in a floating state. Therefore, the dummy pattern might not include a path along which current may flow. In addition, a plurality of dummy pattern areas DPA respectively including dummy patterns may be included in each of the driving touch cells TX_SE and the sensing touch cell RX_SE. The dummy pattern areas DPA may be regularly arranged or be randomly arranged.

The dummy pattern of the dummy pattern area DPA decreases a difference in external light reflexibility, so that the probability that a pattern blur of the touch cell TSE will be visible to a user can be reduced.

In an embodiment, the touch pattern areas TPA configured with the touch pattern as a conductor may be integrally formed. The touch pattern and the dummy pattern are spaced apart from each other.

In an embodiment, the touch pattern area TPA and the dummy pattern area DPA may include a mesh pattern configured with fine conductive lines so as to increase image visibility and image quality.

Figure 5:
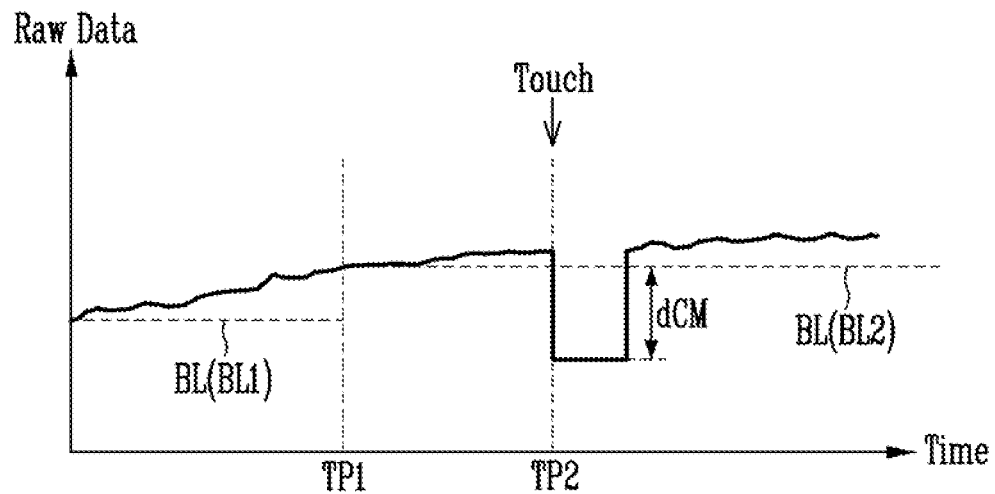
FIG. 5 is a diagram illustrating an example of updating a baseline according to a change in raw data corresponding to a touch sensing signal.

FIG. 5 is a diagram illustrating an example of updating a baseline according to a change in raw data corresponding to a touch sensing signal.

Referring to FIGS. 1, 3A, and 5, the sensor driver SDR may set (e.g., update) a baseline BL, based on a touch sensing signal TSS.

In an embodiment, the touch sensing signal TSS may be defined or generated based on a difference between raw data provided from the first signal lines SL1-1 to SL1-5 and the baseline BL. The raw data may be changed according to a touch input, in proportion to a mutual capacitance between a sensing electrode and a driving electrode, which are formed in the touch sensing area TSA. Also, the raw data (i.e., the mutual capacitance) may be changed in response to a peripheral temperature change.

The baseline BL may be understood as a reference value of a capacitance formed in each of the sensing electrodes RX1 to RX5 and the driving electrodes TX1 to TX4 or a base capacitance (or reference capacitance). For example, a base capacitance of each of the sensing electrodes RX1 to RX5 may be a capacitance between each of the sensing electrodes RX1 to RX5 and a system ground in a state in which there is no user input. In addition, a base capacitance of each of the driving electrodes TX1 to TX4 may be a capacitance between each of the driving electrodes TX1 to TX4 and the system ground in a state in which there is no user input. The system ground may be set as a conductor, to which a DC power source is provided, or a real ground.

In an embodiment, the system ground may be integrally formed in the display area of the display panel DS on the bottom of the touch sensor TS and may be set as a common electrode constituting the light emitting element (e.g., a cathode electrode of the light emitting element). A voltage of the DC power source for light emission of the light emitting element may be provided to the common electrode of the display panel DP.

The sensor driver SDR may recognize a touch of the user, based on a variation in raw data with respect to the baseline BL. For example, a reference for determining a variation dCM in mutual capacitance may be the baseline BL. When the variation dCM in mutual capacitance is greater than a predetermined reference value, the sensor driver SDR may determine that a touch input has occurred.

The raw data is influenced by not only the touch input but also a peripheral environment factor (particularly, a peripheral temperature change). Similarly, a value of the baseline BL understood as the base capacitance may also be influenced by the peripheral temperature change. Therefore, when a fixed value of the baseline BL is compared with the raw data, an accurate variation in mutual capacitance, which is caused by the touch, may be calculated.

For example, the mutual capacitance may be proportional to a dielectric constant of an insulator between the sensing electrode and the driving electrode, and the dielectric constant may be changed with temperature. Accordingly, the mutual capacitance and the base capacitance corresponding to the baseline BL may become greater as the temperature becomes higher.

Therefore, the sensor driver SDR may reset the baseline BL by cyclically or non-cyclically determining a change in the raw data or a value of the raw data.

For example, the sensor driver SDR may update an existing first baseline BL1 to a second baseline BL2 by using raw data calculated at a first time TP1. The baseline BL used during a predetermined period after the first time TP1 may be a value of the second baseline BL2.

When the raw data is changed as a touch is input at a second time TP2, a variation in raw data with respect to the second baseline BL2 may be output as the variation dCM in mutual capacitance. Accordingly, the sensor driver SDR can sense a touch input at a corresponding position.

When the first baseline BL1 is maintained at the second time TP2, the variation dCM in mutual capacitance may be calculated as a much smaller value, and touch recognition might not be made.

As described above, the sensor driver SDR may determine a touch input by using a baseline tracking method of updating the value of the baseline BL by reflecting a touch peripheral temperature change. Thus, the accuracy of touch recognition may be increased.

Figure 6:
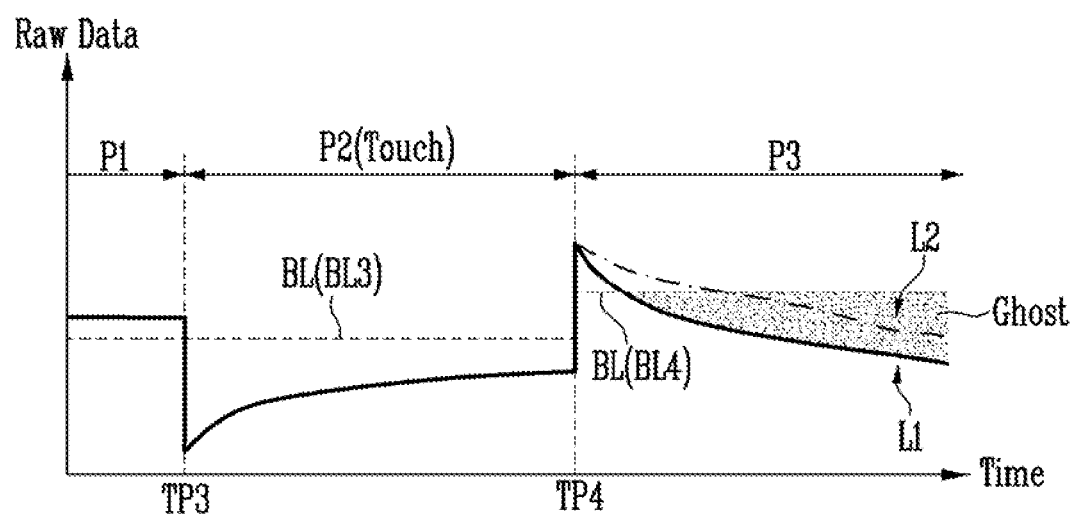
FIG. 6 is a diagram illustrating an example of a change in raw data according to a touch input in a low temperature condition and a baseline updated according the change in raw data.

FIG. 6 is a diagram illustrating an example of a change in raw data according to a touch input in a low temperature condition and a baseline updated according the change in raw data.

Referring to FIGS. 1, 3A, 5, and 6, the value of the baseline BL may be changed by a sudden change in temperature according to occurrence of a touch input in a low temperature condition.

For example, the low temperature condition may be an environment of 0° C. or lower. However, the low temperature condition is not necessarily limited thereto.

A first period P1 and a third period P3 are in a state in which no touch input exists, and a touch input is made during a second period P2. For example, the second period P2 may be a period in which a contact of a finger with respect to the touch sensing area TSA is maintained during a relatively long time.

At a third time TP3, a value of raw data corresponding to the mutual capacitance may be decreased by the touch input. In addition, during the second period P2 in which a touch state is maintained, a temperature of a touched portion may increase due to a body temperature, and the value of the raw data may increase.

When the touch is released at a fourth time TP4, the raw data may again increase by a magnitude of the mutual capacitance which was dropped at the third time TP3. Accordingly, the baseline BL may be updated from a value of a third baseline BL3 to a value of a fourth baseline BL4 by driving using the baseline tracking method.

In addition, during the third period P3, a temperature of the touch sensor TS may be rapidly lowered by a peripheral temperature, and therefore, the raw data (i.e., the mutual capacitance) may be rapidly changed (e.g., represented by a first curve L1 in FIG. 6). When the raw data is rapidly decreased before the baseline is again updated, the sensor driver SDR may misrecognize a touch. For example, in the third period P3 in which no touch input exists, a touch may be recognized at a corresponding position (referred to as a ghost touch).

To reduce touch misrecognition in a low temperature environment by using the baseline tracking method, a variation in mutual capacitance per time may be decreased, which is used to prevent a sudden change in raw data in the third period. For example, when a change in raw data such as the first curve L1 in the third period P3 becomes gradual such as a second curve L2 until the baseline BL is again updated, touch misrecognition can be reduced.

In an embodiment, an RC delay of a corresponding touch sensing area may be increased so as to decrease the variation in mutual capacitance per time. However, an RC delay of the entire touch sensing area is increased, touch sensitivity and accuracy may be decreased, and accordingly, a method of increasing an RC delay only in a required partial area.

In particular, the area in which the fingerprint sensor FS is disposed may be used for releasing a lock state of an electronic device including the display device 1000, and the structure of the touch sensor TS may be modified such that touch recognition of the corresponding part in an extreme environment of a low temperature or high temperature is easily made (e.g., touch recognition may be resilient against a temperature change).

For example, a structure in which a resistance component and/or a capacitance component of the corresponding part is increased may be applied so as to increase an RC delay of a touch sensing signal TSS in the area in which the fingerprint sensor FS is disposed.

Figure 7:
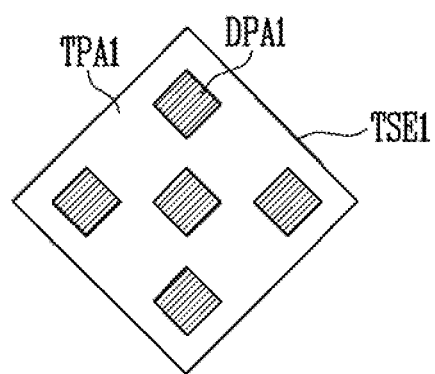
FIG. 7 is a plan view illustrating an example of a first touch cell and a second touch cell, which are included in the touch sensor shown in FIG. 3A.
Figure 7:
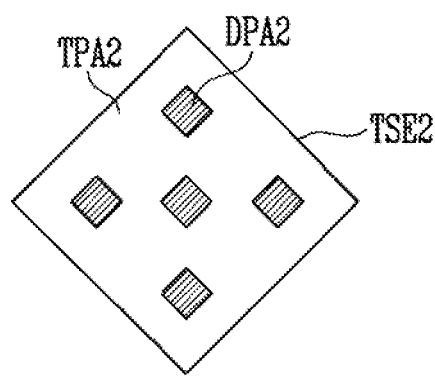
Figure 8:
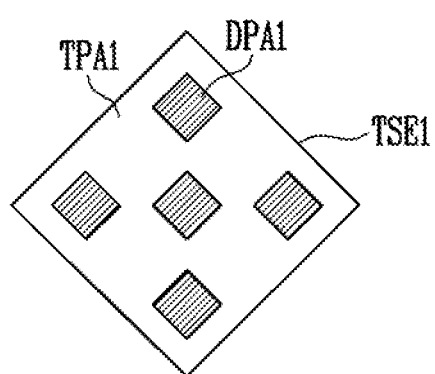
FIG. 8 is a plan view illustrating an example of the first touch cell and the second touch cell, which are included in the touch sensor shown in FIG. 3A.
Figure 8:
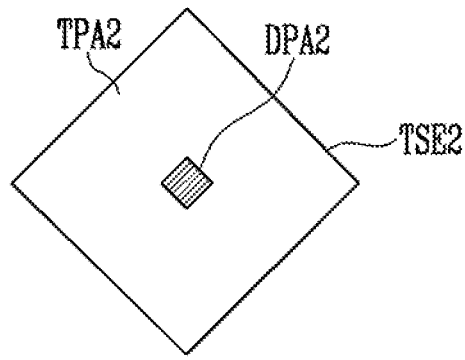

FIG. 7 is a plan view illustrating an example of the first touch cell and the second touch cell, which are included in the touch sensor shown in FIG. 3A. FIG. 8 is a plan view illustrating an example of the first touch cell and the second touch cell, which are included in the touch sensor shown in FIG. 3A.

Referring to FIGS. 1, 3A, 4, 7, and 8, the first touch cell TSE1 may include a first area (or, a first touch pattern area) TPA1 in which a first touch pattern is disposed and a first dummy pattern area DPA1 in which a first dummy pattern is disposed, and the second touch cell TSE2 may include a second area (or, a second touch pattern area) TPA2 in which a second touch pattern is disposed and a second dummy pattern area DPA2 in which a second dummy pattern is disposed.

A total area of the first dummy pattern area DPA1 of each first touch cell TSE1 may be greater than a total area of the second dummy pattern area DPA2 of each second touch cell TSE2. In an embodiment, as shown in FIG. 7, an area of each first dummy pattern area DPA1 may be greater than an area of each second dummy pattern area DPA2. In an embodiment, as shown in FIG. 8, a number of first dummy pattern areas DPA1 may be greater than a number of second dummy pattern areas DPA2.

Accordingly, an area of the first area TPA1 of the first touch cell TSE1 may be smaller than an area of the second area TPA2 of the second touch cell TSE2. For example, a magnitude of a base capacitance of the second touch cell TSE2 may be greater than a magnitude of a base capacitance of the first touch cell TSE1 actually involved in touch recognition.

Therefore, an RC delay of a touch sensing signal TSS provided in the second touch sensing area TSA2 may be greater than an RC delay of a touch sensing signal TSS provided in the first touch sensing area TSA1. Accordingly, touch misrecognition of the second touch sensing area TSA2 in an extreme environment of a low temperature condition or the like can be reduced.

In an embodiment, the touch patterns and the dummy patterns may include a mesh pattern formed with fine conductive lines.

In an embodiment, the first touch cell TSE1 may include a first sensing touch cell RX_SE1 and a first driving touch cell TX_SE1. The second touch cell TSE2 may include a second sensing touch cell RX_SE2 and a second driving touch cell RX_SE2.

However, the first and second dummy pattern areas DPA1 and DPA2 shown in FIG. 7 and/or FIG. 8 may be applied exclusively to the first sensing touch cell RX_SE1 and the second sensing touch cell RX_SE2. For example, the first driving touch cell TX_SE1 and the second driving touch cell TX_SE2, which are electrically connected to each other, may have the same shape.

Figure 9:
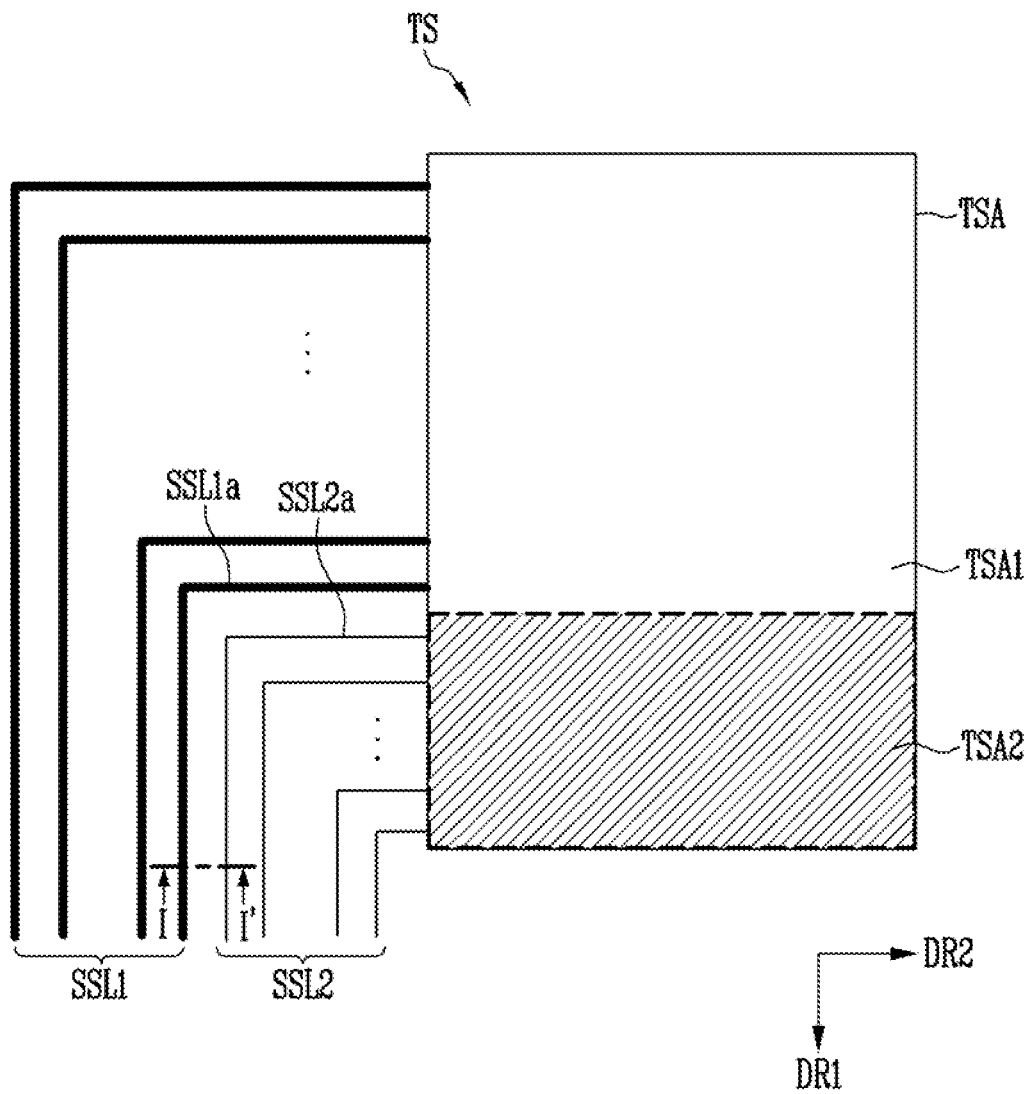
FIG. 9 is a schematic diagram illustrating an example of the touch sensor shown in FIG. 3A.
Figure 10:
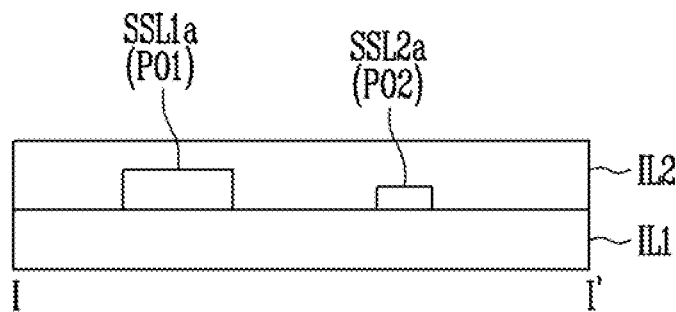
FIG. 10 is a cross-view illustrating an example taken along line I-I' of the touch sensor shown in FIG. 9.

FIG. 9 is a schematic diagram illustrating an example of the touch sensor shown in FIG. 3A. FIG. 10 is a cross-sectional view illustrating an example taken along line I-I' of the touch sensor shown in FIG. 9.

Referring to FIGS. 1, 3A, and 9, the touch sensor TS may include touch electrodes configured with touch cells arranged corresponding to a touch sensing area TSA and sensing lines SSL1 and SSL2 connected to the touch electrodes.

In FIG. 9, for convenience of description, illustration of the sensing electrodes RX1 to RX5, the driving electrodes TX1 to TX4, and the second signal lines SL2-1 to SL2-4, which are shown in FIG. 3A, will be omitted. However, it is to be understood that these omitted elements may indeed be present within the displayed apparatus.

The touch sensing area TSA may include a first touch sensing area TSA1 and a second touch sensing area TSA2.

First sensing lines SSL1 and second sensing lines SSL2 may include the first signal lines SL1-1 to SL1-5 shown in FIG. 3A. The first sensing lines SSL1 may be connected to sensing electrodes of the first touch sensing area TSA1, and the second sensing lines SSL2 may be connected to sensing electrodes of the second touch sensing area TSA2. As described above, an RC delay of a touch sensing signal TSS corresponding to the second touch sensing area TSA2 may be greater than an RC delay of a touch sensing signal TSS corresponding to the first touch sensing area TSA1. To this end, a line resistance of the second sensing lines SSL2 may be designed to be greater than a line resistance of the first sensing lines SSL1.

Each of the first and second sensing lines SSL1 and SSL2 may include a part extending in the second direction DR2 and a part extending in the first direction DR1. Each of the first and second sensing lines SSL1 and SSL2 may extend to the pad area NDA-PD.

FIG. 10 illustrates a section of a first portion PO1 of one (hereinafter, referred to as a first sensing line SSL1a) of the first sensing lines SSL1 and a second portion PO2 of one (hereinafter, referred to as a second sensing line SSL2a) of the second sensing lines SSL2. In an embodiment, the first sensing line SSL1a and the second sensing line SSL2a may be disposed on a first insulating layer IL1.

The first insulating layer IL1 may be disposed on an encapsulation layer of the display panel DP. The first insulating layer IL1 may include an organic insulating material and/or an inorganic insulating material. For example, the first insulating layer IL1 may include silicon oxide, silicon nitride, and/or silicon oxynitride.

The first sensing line SSL1a and the second sensing line SSL2a may include a conductive material. The conductive material may include a transparent conductive oxide or a metal material. For example, the first sensing line SSL1a and the second sensing line SSL2a may include molybdenum, silver, titanium, copper, aluminum, and/or alloys thereof. Alternatively, the first sensing line SSL1a and the second sensing line SSL2a may include a transparent conductive oxide such as indium tin oxide (ITO), indium zinc oxide (IZO), zinc oxide (ZnO), and/or indium tin zinc oxide (ITZO). The transparent conductive material may include conductive polymer such as PEDOT, metal nanowire, graphene, and the like.

In an embodiment, as shown in FIGS. 9 and 10, a width of the first sensing line SSL1a in a horizontal direction may be greater than a width of the second sensing line SSL2a in the horizontal direction. For example, the width of the second sensing line SSL2a may be equal to or smaller than 70% of the width of the first sensing line SSL1a.

In an embodiment, a thickness (e.g., a thickness in the third direction DR3 shown in FIG. 2) of the first sensing line SSL1a may be greater than a thickness of the second sensing line SSL2a. For example, the thickness of the second sensing line SSL2a may be equal to or smaller than 70% of the thickness of the first sensing line SSL1a.

Therefore, a resistance of the second sensing line SSL2a may be greater than a resistance of the first sensing line SSL1a.

In an embodiment, the first sensing line SSL1a and the second sensing line SSL2a may have different thicknesses through a sputtering process of directly depositing a conductive pattern. Alternatively, in an embodiment, the first sensing line SSL1a and the second sensing line SSL2a may have different thicknesses and/or different widths through process such as dry etching or wet etching with respect to an entirely deposited conductive material.

A second insulating layer IL2 covering the first sensing line SSL1a and the second sensing line SSL2a may be disposed on the first insulating layer IL1. The second insulating layer IL2 may include silicon oxide, silicon nitride, and/or silicon oxynitride.

Although a case where the width and thickness of the first sensing line SSL1a are respectively greater than the width and thickness of the second sensing line SSL2a is illustrated in FIG. 10, the present disclosure is not necessarily limited thereto. For example, the width of the first sensing line SSL1a and the width of the second sensing line SSL2a may be substantially equal to each other, and the thickness of the first sensing line SSL1a may be greater than the thickness of the second sensing line SSL2a. Alternatively, the thickness of the first sensing line SSL1a and the thickness of the second sensing line SSL2a may be substantially equal to each other, and the width of the first sensing line SSL1a may be greater than the width of the second sensing line SSL2a.

As described above, a resistance of the second sensing lines SSL2 is greater than a resistance of the first sensing lines SSL1, so that an RC delay of a touch sensing signal TSS provided in the second touch sensing area TSA2 can be greater than an RC delay of a touch sensing signal TSS provided in the first touch sensing area TSA1. Thus, touch recognition of the second touch sensing area TSA2 can be strong and resilient to a temperature change.

In an embodiment, the configuration of the first and second sensing lines SSL1 and SSL2 shown in FIG. 9 and the configuration of the dummy pattern areas DPA1 and DPA2 described with reference to FIG. 8 may be designed to be combined with each other.

Figure 11:
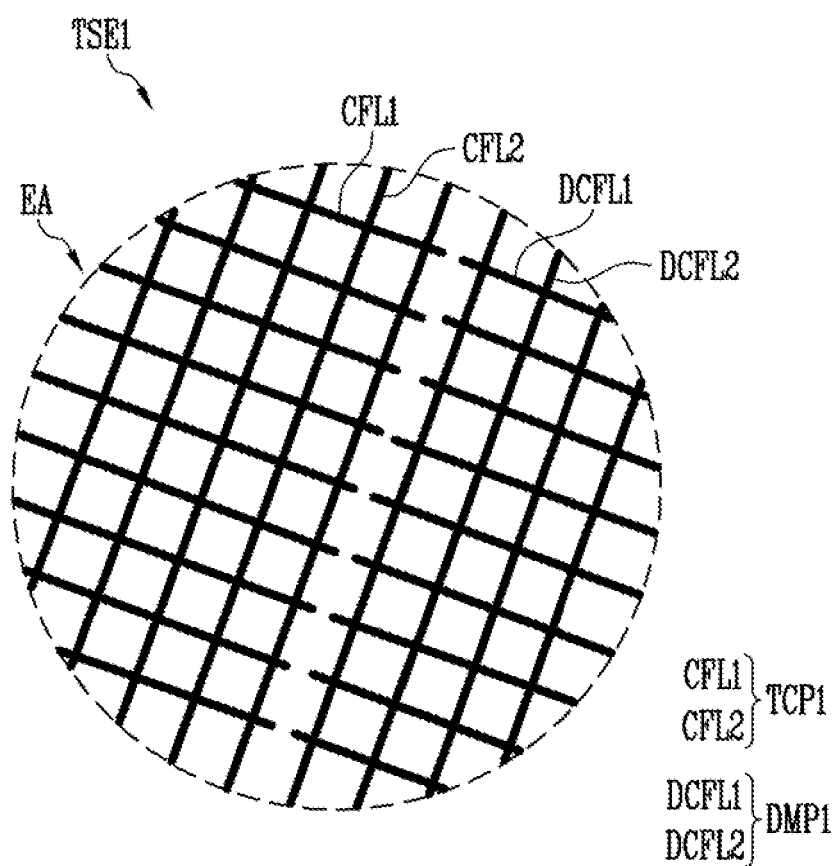
FIG. 11 is an enlarged view illustrating an example of area EA of the first touch cell.
Figure 12:
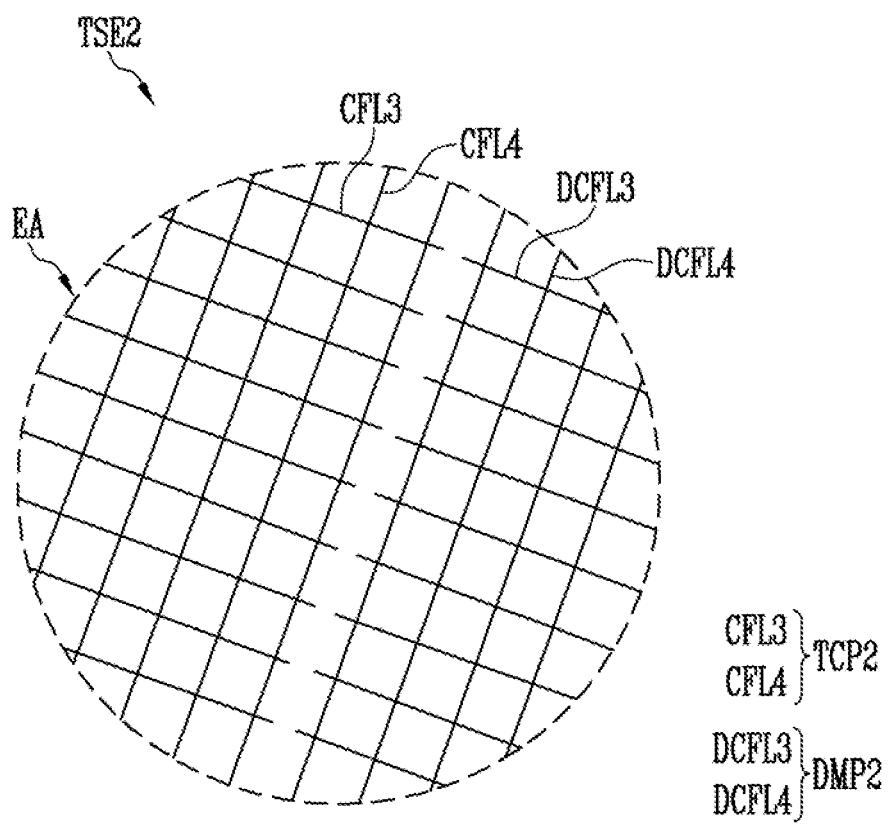
FIG. 12 is an enlarged view illustrating an example of the area EA of the second touch cell.
Figure 13:
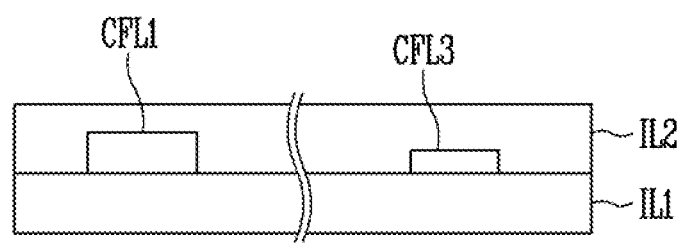
FIG. 13 is a cross-sectional view illustrating an example of a fine conductive line of the first touch cell and a fine conductive line of the second touch cell.

FIG. 11 is an enlarged view illustrating an example of area EA of the first touch cell. FIG. 12 is an enlarged view illustrating an example of the area EA of the second touch cell. FIG. 13 is a cross-sectional view illustrating an example of a fine conductive line of the first touch cell and a fine conductive line of the second touch cell.

Referring to FIGS. 3A, 4, 11, 12, and 13, the first touch cell TSE1 may include a first touch pattern TCP1 and a first dummy pattern DMP1, and the second touch cell TSE2 may include a second touch pattern TCP2 and a second dummy pattern DMP2.

The first touch pattern TCP1 and the first dummy pattern DMP1 may be spaced apart from each other and may be electrically insulated from each other. Similarly, the second touch pattern TCP2 and the second dummy pattern DMP2 may be spaced apart from each other and may be electrically insulated from each other.

In an embodiment, the first touch cell TSE1 may include a first sensing touch cell RX_SE1 and a first driving touch cell TX_SE1. The second touch cell TSE2 may include a second sensing touch cell RX_SE2 and a second driving touch cell RX_SE2.

The first touch pattern TCP1 and the first dummy pattern DMP1, which are shown in FIG. 11, may be applied to only the first sensing touch cell RX_SE1, and the second touch pattern TCP2 and the second dummy pattern DMP2, which are shown in FIG. 12, may be applied to only the second sensing touch cell RX_SE2. For example, the first driving touch cell TX_SE1 and the second driving touch cell RX_SE2, which are electrically connected to each other, may have the same shape.

In an embodiment, the first touch pattern TCP1 and the second touch pattern TCP2 may include a mesh pattern. The first touch pattern TCP1 may include a first fine conductive line CFL1 and a second fine conductive line CFL2, which intersect each other. The second touch pattern TCP2 may include a third fine conductive line CFL3 and a fourth fine conductive line CFL4, which intersect each other.

In an embodiment, as shown in FIGS. 11 and 12, a width of the first and second fine conductive lines CFL1 and CFL2 may be greater than a width of the third and fourth fine conductive lines CFL3 and CFL4. Therefore, a resistance of the second touch pattern TCP2 may be greater than a resistance of the first touch pattern TCP1, and an RC delay of a touch sensing signal TSS corresponding to the second touch sensing area TSA2 may be greater than an RC delay of a touch sensing signal TSS corresponding to the first touch sensing area TSA.

For example, the width of the third and fourth fine conductive lines CFL3 and CFL4 may be equal to or smaller than 70% of the width of the first and second fine conductive lines CFL1 and CFL2. The second fine conductive line CFL2 and the fourth fine conductive line CFL4 may be disposed in the same layer as the first fine conductive line CFL1 and the third fine conductive line CFL3. The conductive material constituting the first to fourth fine conductive lines CFL1, CFL2, CFL3, and CFL4 may include a transparent conductive material, a transparent conductive oxide, or a metal material.

In an embodiment, the first fine conductive line CFL1 and the second fine conductive line CFL2 may be thicker than the third fine conductive line CFL3 and the fourth fine conductive line CFL4. Therefore, a resistance of the second touch pattern TCP2 may be greater than a resistance of the first touch pattern TCP1, and an RC delay of a touch sensing signal TSS corresponding to the second touch sensing area TSA2 may be greater than an RC delay of a touch sensing signal TSS corresponding to the first touch sensing area TSA.

For example, a thickness of the third and fourth fine conductive lines CFL3 and CFL4 may be equal to or smaller than a thickness of the first and second fine conductive lines CFL1 and CFL2.

In an embodiment, the first touch pattern TCP1 and the second touch pattern TCP2 may have different thicknesses through a sputtering process of directly depositing a conductive pattern. In an embodiment, the first touch pattern TCP1 and the second touch pattern TCP2 may have different thicknesses and/or different widths through a process such as dry etching or wet etching with respect to an entirely deposited conductive material.

In an embodiment, the first dummy pattern DMP1 and the second dummy pattern DMP2 may include a mesh pattern. The first dummy pattern DMP1 may include a first dummy fine conductive line DCFL1 and a second dummy fine conductive line DCFL2, which intersect each other. The second dummy pattern DMP2 may include a third dummy fine conductive line DCFL3 and a fourth dummy fine conductive line DCFL4, which intersect each other.

In an embodiment, as shown in FIGS. 11 and 12, a width of the first and second dummy fine conductive lines DCFL1 and DCFL2 may be greater than a width of the third and fourth dummy fine conductive lines DCFL3 and DCFL4. In addition, a thickness of the first and second dummy fine conductive lines DCFL1 and DCFL2 may be greater than a thickness of the third and fourth dummy fine conductive lines DCFL3 and DCFL4. For example, in terms of process convenience, the first and second dummy fine conductive lines DCFL1 and DCFL2 may have the substantially same width and thickness as the first and second fine conductive lines CFL1 and CFL2, and the third and fourth dummy fine conductive lines DCFL3 and DCFL4 may have the substantially same width and thickness as the third and fourth fine conductive lines CFL3 and CFL4.

As described above, the resistance of the second touch pattern TCP2 is formed greater than the resistance of the first touch pattern TCP1, so that an RC delay of a touch sensing signal TSS provided in the second touch sensing area TSA2 can be greater than an RC delay of a touch sensing signal TSS provided in the first touch sensing area TSA1. Touch recognition of the second touch sensing area TSA2 can be resilient to a temperature change.

In an embodiment, the configuration of the first and second touch cells TSE1 and TSE2 shown in FIGS. 11 to 13 may be designed to be combined with the configuration of the first and second sensing lines SSL1 and SSL2 and/or the configuration of the dummy pattern areas DPA1 and DPA2 described with reference to FIGS. 7 and 8.

Figure 14:
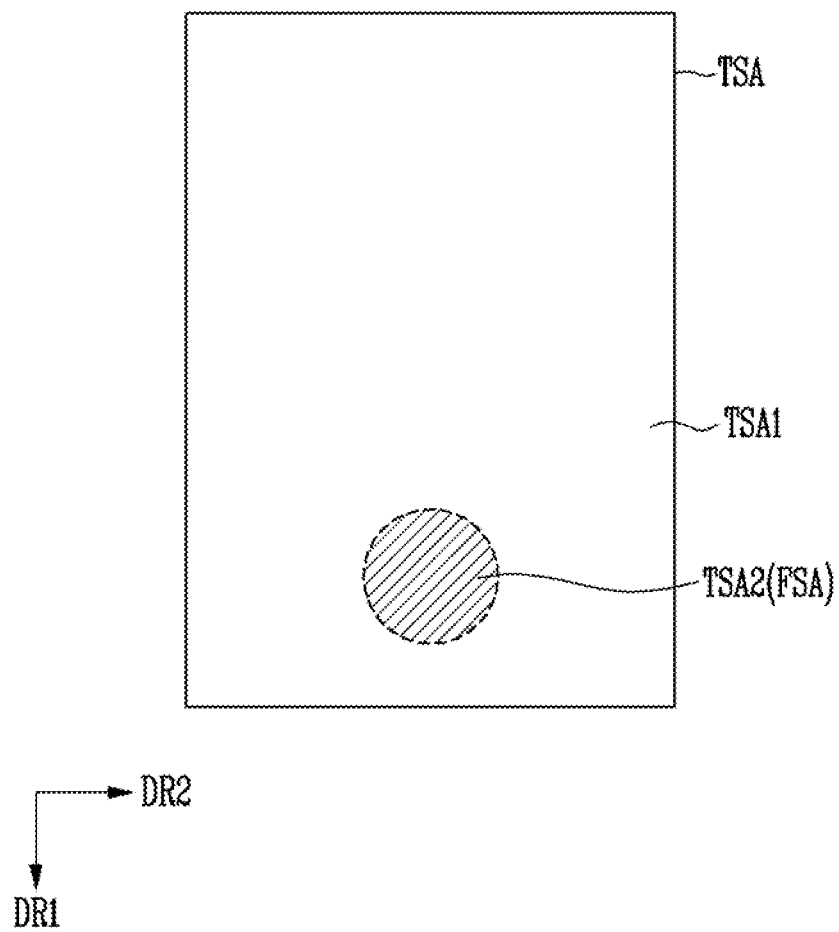
FIG. 14 is a plan view illustrating an example of a touch area of the touch sensor included in the display device shown in FIG. 1.
Figure 15:
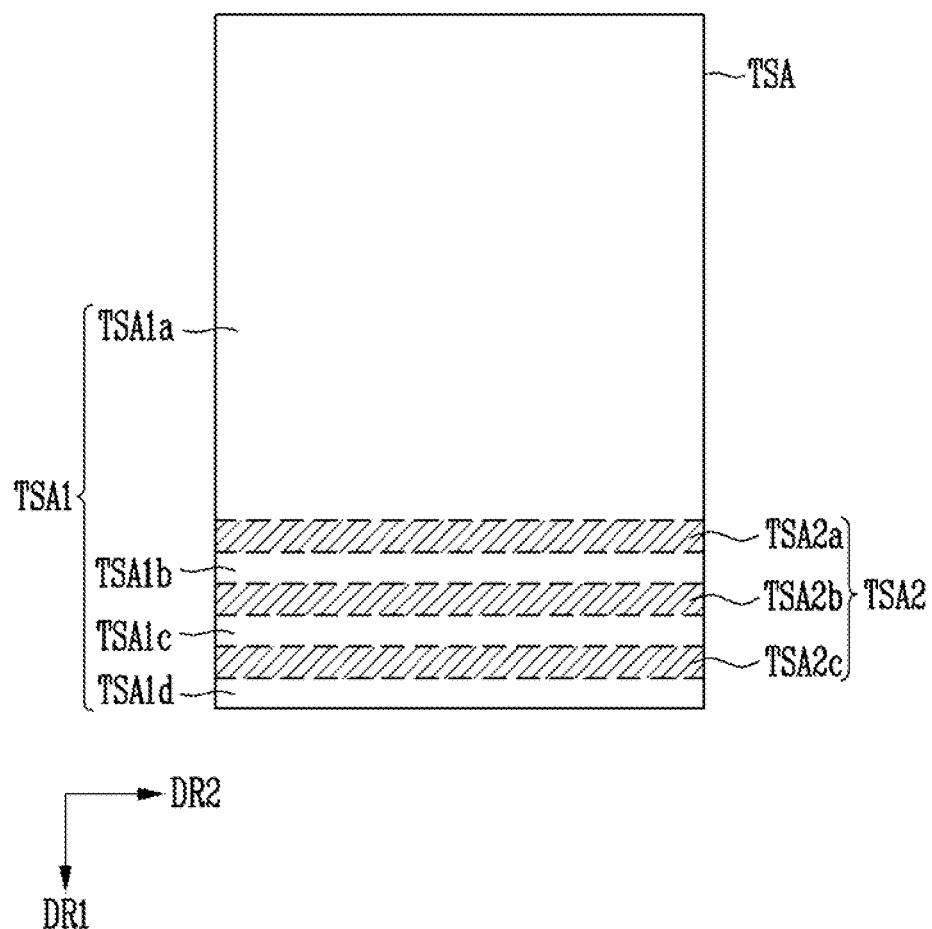
FIG. 15 is a plan view illustrating an example of the touch area of the touch sensor included in the display device shown in FIG. 1.
Figure 16:
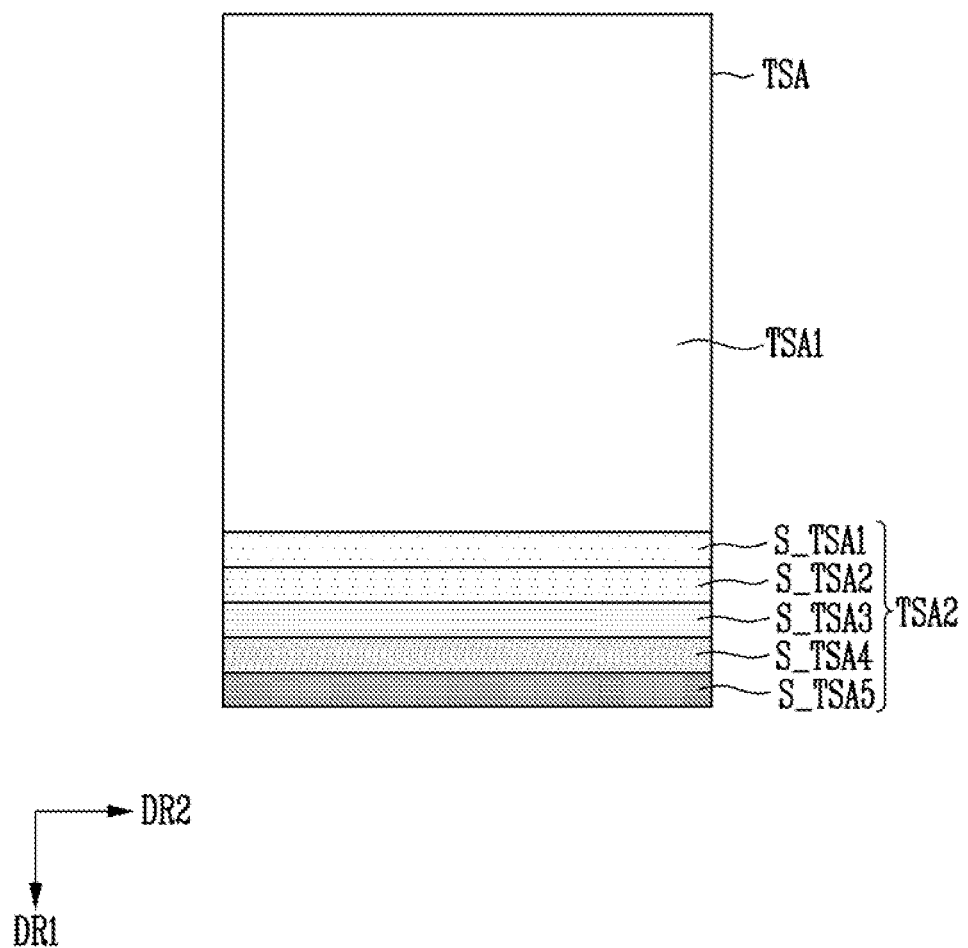
FIG. 16 is a plan view illustrating an example of the touch area of the touch sensor included in the display device shown in FIG. 1.
Figure 17:
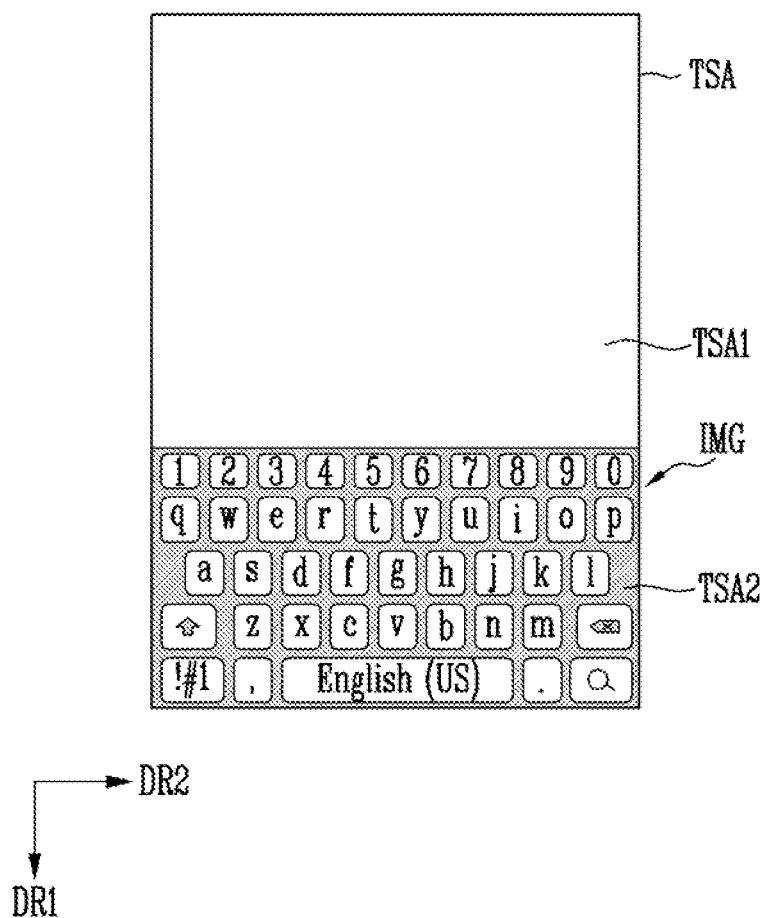
FIG. 17 is a plan view illustrating an example of the touch area of the touch sensor included in the display device shown in FIG. 1.

FIG. 14 is a plan view illustrating an example of a touch area of the touch sensor included in the display device shown in FIG. 1. FIG. 15 is a plan view illustrating an example of the touch area of the touch sensor included in the display device shown in FIG. 1. FIG. 16 is a plan view illustrating an example of the touch area of the touch sensor included in the display device shown in FIG. 1. FIG. 17 is a plan view illustrating an example of the touch area of the touch sensor included in the display device shown in FIG. 1.

Referring to FIGS. 1, 3A, 14, 15, 16, and 17, the touch sensing area TSA of the touch sensor TS may include a first touch sensing area TSA1 and a second touch sensing area TSA2.

An RC delay of a touch sensing signal TSS corresponding to the second touch sensing area TSA2 may be greater than an RC delay of a touch sensing signal TSS corresponding to the first touch sensing area TSA1. In an embodiment, as described with reference to FIGS. 7 and 8, a total area of a dummy pattern area of an individual touch cell of the second touch sensing area TSA2 may be smaller than a total area of a dummy pattern area of an individual touch cell of the first touch sensing area TSA1. In an embodiment, as described with reference to FIGS. 11 and 12, a resistance of the second touch pattern TCP2 of the second touch sensing area TSA2 may be greater than a resistance of the first touch pattern TCP1 of the first touch sensing area TSA1.

In an embodiment, as shown in FIG. 14, a second touch sensing area TSA2 may have a size corresponding to the shape of a fingerprint sensing area FSA. In a normal condition, the second touch sensing area TSA2 having a relatively large RC delay has a touch sensitivity lower than a touch sensitivity of the first touch sensing area TSA1. Thus, the area of the second touch sensing area TSA2 is minimized, thereby minimizing lowering of the entire touch sensitivity.

In an embodiment, as shown in FIG. 15, a first touch sensing area TSA1 may include a plurality of first sub-touch sensing areas TSA1a, TSA1b, TSA1c, and TSA1d, and a second touch sensing area TSA2 may include a plurality of second sub-touch sensing areas TSA2a, TSA2b, and TSA2c. The first sub-touch sensing areas TSA1a, TSA1b, TSA1c, and TSA1d and the second sub-touch sensing areas TSA2a, TSA2b, and TSA2c may be alternately disposed in the first direction DR1. An area of the second touch sensing area TSA2 is decreased, so that the lowering of the entire touch sensitivity can be reduced. RC delays respectively corresponding to the second sub-touch sensing areas TSA2a, TSA2b, and TSA2c may be equal to or different from one another.

In an embodiment, as shown in FIG. 16, a second touch sensing area TSA2 may include a plurality of sub-touch sensing areas S_TSA1, S_TSA2, S_TSA3, S_TSA4, and S_TSA5. An RC delay corresponding to the sub-touch sensing areas S_TSA1, S_TSA2, S_TSA3, S_TSA4, and S_TSA5 may be gradually changed in the first direction DR1. For example, an area of a dummy pattern area of an individual cell of each of the sub-touch sensing areas S_TSA1, S_TSA2, S_TSA3, S_TSA4, and S_TSA5 may gradually decrease (i.e., an increase in base capacitance). Alternatively, a width and/or a thickness of a touch pattern of each of the sub-touch sensing areas S_TSA1, S_TSA2, S_TSA3, S_TSA4, and S_TSA5 may gradually decrease (i.e., an increase in resistance).

Thus, touch sensitivity in the second touch sensing area TSA2 may be maintained.

In an embodiment, as shown in FIG. 17, the display panel DP may display a keypad image IMG. A second touch sensing area TSA2 may overlap with an area in which the keypad image IMG is displayed. Thus, the accuracy of a key input using a touch in an extreme situation of a low temperature condition or the like can be increased.

As described above, the touch sensor and the display device including the same in accordance with the embodiments of the present disclosure may include a second touch sensing area TSA2 overlapping with a fingerprint sensor FSA and/or a keypad image IMG. A capacitance of the touch cells, a resistance of the touch cells, and/or a resistance of the sensing lines may be designed differently for each touch sensing area such that an RC delay of a touch sensing signal corresponding to the second touch sensing area TSA2 is greater than an RC delay of a touch sensing signal corresponding to another touch sensing area. Thus, in the touch sensor and the display device including the same, which are driven by using the baseline tracking method, lowering of touch sensitivity can be minimized, and simultaneously, touch misrecognition/malfunction of the second touch sensing area TSA2 in an extreme environment of a low temperature or high temperature condition can be reduced (e.g., resilience against a temperature change).

Further, the design of a touch sensor structure is partially changed in a hardware manner, so that malfunction in a low temperature environment can be prevented. Accordingly, cost for software touch compensation driving to prepare for a low temperature environment and manufacturing cost can be reduced.

In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure.

What is claimed is:

1. A touch sensor, comprising:
    first touch cells disposed in a first touch sensing area, the first touch cells each including a first touch pattern and a first dummy pattern that is disposed within a first dummy pattern area; and
    second touch cells disposed in a second touch sensing area, the second touch cells each including a second touch pattern and a second dummy pattern that is disposed within a second dummy pattern area,
    wherein a fingerprint sensor overlaps the second touch sensing area but not the first touch sensing area,
    wherein an area of the first touch sensing area is greater than an area of the second touch sensing area, and
    wherein an area of the first dummy pattern area in the first touch sensing area that does not overlap the fingerprint sensor is greater than an area of the second dummy pattern area in the second touch sensing area that overlaps the fingerprint sensor.

2. The touch sensor of claim 1, wherein the first touch pattern is disposed within a first touch pattern area, the second touch pattern is disposed within a second touch pattern area, and an area of the first touch pattern area is smaller than an area of the second touch pattern area.

3. The touch sensor of claim 1, further comprising:
    first sensing lines each including a first portion connected to a portion of the first touch cells and extended in a first direction in a non-sensing area; and
    second sensing lines each including a second portion connected to a portion of the second touch cells and extended in the first direction in the non-sensing area.

4. Me touch sensor of claim 3, wherein a thickness of the first portion is greater than a thickness of the second portion.

5. The touch sensor of claim 3, wherein a width of the first portion is greater than a width of the second portion.

6. The touch sensor of claim 3, wherein a size of the second dummy pattern area in the second touch sensing area is gradually changed in the first direction.

7. The touch sensor of claim 3, wherein the first touch sensing area includes first sub-touch sensing areas each including the first dummy pattern area, wherein the second touch sensing area includes second sub-touch sensing areas each including the second dummy pattern area, and wherein the first sub-touch sensing areas and the second sub-touch sensing areas are alternately disposed in the first direction.

8. The touch sensor of claim 1, wherein each of the first touch pattern, the second touch pattern, the first dummy pattern, and the second dummy pattern includes a mesh pattern formed with fine conductive lines.

9. The touch sensor of claim 8, wherein a thickness of the fine conductive lines of the first touch pattern is greater than a thickness of the fine conductive lines of the second touch pattern.

10. The touch sensor of claim 9, wherein a width of the fine conductive lines of the first touch pattern is greater than a width of the fine conductive lines of the second touch pattern.

11. The touch sensor of claim 8, wherein a thickness of the fine conductive lines of the first dummy pattern is greater than a thickness of the fine conductive lines of the second dummy pattern.

12. The touch sensor of claim 8, wherein a width of the fine conductive lines of the first dummy pattern is greater than a width of the fine conductive lines of the second dummy pattern.

13. The touch sensor of claim 1, further comprising:
a sensor driver configured to determine a touch position, based on a difference between raw data provided from the first touch cells and the second touch cells and a value of a baseline corresponding to a base capacitance of the first and second touch cells, and update the value of the baseline, based on a change in the raw data in a state in which there is no touch input.

14. A display device, comprising:
a display panel including a display area having pixels; and
a touch sensor including a first touch sensing area and a second touch sensing area,
wherein the touch sensor is configured to sense a touch input,
wherein the first touch sensing area and the second touch sensing area each overlap the display area,
wherein the touch sensor comprises:
first touch cells disposed in the first touch sensing area, the first touch cells each including a first touch pattern and a first dummy pattern disposed within a first dummy pattern area; and
second touch cells disposed in the second touch sensing area, the second touch cells each including a. second touch pattern and a second dummy pattern disposed within a second dwnmy pattern area,
wherein a fingerprint sensor overlaps the second touch sensing area but not the first touch sensing area,
wherein an area of the first touch sensing area in the first touch sensing area that does not overlap the fingerprint sensor is greater than an area of the second touch sensing area in the second touch sensing area that overlaps the fingerprint sensor, and
wherein an area of the first dummy pattern area is greater than an area of the second dummy pattern area.

15. The display device of claim 14, wherein the first touch pattern is disposed within a first touch patternarea, the second touch pattern is disposed within a second touch pattern area, and an area of the first touch pattern area is smaller than an area of the second touch pattern area.

16. The display device of claim 14, wherein the touch sensor further comprises:

first sensing lines each including a first portion connected to a portion of the first touch cells and extended in a first direction in a non-sensing area; and second sensing lines each including a second portion connected to a portion of the second touch cells and extended in the first direction in the non-sensing area, and wherein a width of the first portion is greater than a width of the second portion.

17. The display device of claim 14, wherein the touch sensor further comprises:
first sensing lines each including a first portion connected to a portion of the first touch cells and extended in a first direction in a non-sensing area; and
second sensing lines each including a second portion connected to a portion of the second touch cells and extended in the first direction in the non-sensing area, and
wherein a thickness of the first portion is greater than a thickness of the second portion.

18. The display device of claim 14, wherein the display panel displays a keypad image overlapping the second touch sensing area.

19. A display device, comprising:
a display panel including a display area having pixels; and
a touch sensor including a first touch sensing area and a second touch sensing area,
wherein the touch sensor is configured to sense a touch input,
wherein the first touch sensing area and the second touch sensing, area each overlap the display area,
wherein the touch sensor comprises:
first touch cells disposed in the first touch sensing area;
second touch cells disposed in the second touch sensing area;
first sensing lines each including a first portion connected to a portion of the first touch cells and extended in a first direction in a non-sensing area; and
second sensing lines each including a second portion connected to a portion of the second touch cells and extended in the first direction in the non-sensing area,
wherein a fingerprint sensor overlaps the second touch sensing area but not the first touch sensing area,
wherein an area of the first touch sensing area is greater than an area of the second ouch sensing area, and
wherein a width of the first portion in the first touch sensing area that does not overlap the fingerprint sensor is greater than a width of the second portion in the second touch sensing area that does not overlap the fingerprint sensor and/or a thickness of the first portion in the first touch sensing area that does not overlap the fingerprint sensor is greater than a thickness of the second portion in the second touch sensing area that does not overlap the fingerprint sensor.

20. The display device of claim 19, wherein each of the first touch cells includes a first touch pattern and a first dummy pattern, and
wherein each of the second touch cells includes a second touch pattern and a second dummy pattern.

21. The display device of claim 20, wherein each of the first touch pattern and the second touch pattern includes a mesh pattern formed with fine conductive lines, and
wherein a width of the fine conductive lines of the first touch pattern is greater than a width of the fine conductive lines of the second. touch pattern andlor a thickness of the fine conductive lines of the first touch pattern is greater than a thickness of the fine conductive lines of the second touch pattern.

22. The display device of claim 19, wherein the display panel displays a keypad image overlapping the second touch sensing.

23. The display device of claim 19, wherein the touch sensor further comprises:

a sensor driver configured to determine a touch position, based on a difference between raw data provided from the first touch cells and the second touch cells and a value of a baseline corresponding to a base capacitance of the first and second touch cells, and update the value of the baseline, based on a change in the raw data in a state in which there is no touch input.

* * * * *